United States Patent Office 3,467,640
Patented Sept. 16, 1969

3,467,640
PROCESS FOR THE MANUFACTURE OF
CHLORINATED POLYOLEFINS
Joseph Kaupp, Helmut Klug, Karl Heinz Mittelberger, and Hans Georg Koln, all of Gersthofen, Germany, assignors to Farbwerke Hoechst Aktiengesellschaft vormals Meister Lucius & Bruning, Frankfurt am Main, Germany, a corporation of Germany
No Drawing. Continuation-in-part of application Ser. No. 57,618, Sept. 22, 1960. This application Feb. 15, 1965, Ser. No. 432,895
Int. Cl. C08f 29/02, 37/00
U.S. Cl. 260—88.2                    4 Claims

ABSTRACT OF THE DISCLOSURE

A process for the manufacture of highly stable readily soluble chlorination products containing 50–80% of chlorine and having a viscosity of less than 1000 centipoises at 20° C. wherein a portion of the chlorination is conducted above the sintering temperature of the polymer being chlorinated and continuing this part of the chlorination until the chlorine content of the polymer is increased by at least 1% by weight as compared to its chlorine content prior to attaining sintering temperature.

---

The present application is a continuation-in-part application of U.S. patent application Ser. No. 57,618, and relates to the manufacture of soluble chlorination products of substantially crystalline low pressure polymers of α-olefins with at least 3 and preferably 3 to 6 carbon atoms and/or copolymers of such olefins with one another or with ethylene. The chlorination products contain 50–80% and preferably 57–75% of chlorine and have a viscosity of less than 1,000 centipoises in the form of a 20% solution in toluene at 20° C. The starting low pressure polymers preferably have a degree of crystallinity of 60 to 90% determined by X-ray photography. The chlorination is carried out in aqueous suspension at a temperature of at least 100° C.

Various methods of chlorinating polyolefins and copolymers are known and have been described in numerous patent specifications. The methods described may be divided into two groups, i.e., the chlorination in aqueous suspension and the chlorination in solution. The chlorination of substantially crystalline polyolefins in aqueous suspension yields hard and practically insoluble products when carried out at temperatures below 100° C. For example, the products obtained by the process disclosed in Australian Patent 219,209 by chlorinating crystalline low pressure polymers at temperatures below 95° C. exhibit a good resistance to a great number of solvents. It results from the table on page 7 that the products obtained are practically insoluble or soluble to an extent of at most 5% in toluene, tetrahydrofurane, benzene, o-dichlorobenzene and perchloroethylene. It is evident to the expert that solutions of such low concentration are unsuitable as lacquers. The known chlorination of polyethylene at a temperature above 100–110° C. gives soft or rubber-elastic substances which, in general, are better soluble. However, in many cases highly viscous solutions which often have a gel-like consistency are obtained which are unsuitable as binders for lacquers.

According to common conception chlorination products having branched chains are less stable than chlorination products having straight chains and, therefore, it could not be expected that the aforesaid polyolefins could be transformed into readily soluble products by chlorinating them in aqueous suspension, and that products could be obtained which have a better stability than chlorinated polyethylenes. Surprisingly, products of this type can be obtained when the chlorination is carried out at a temperature in the range of from 100° C. to 170° C., advantageously 110° C. to 170° C. In the case of ethylene-containing copolymers the chlorination is carried out at a temperature in the range of from 100° C. to 150° C., advantageously 110° C. to 150° C. The chlorination takes place in a temperature range in which sintering of the polyolefins commences, especially under the chlorination conditions, and in which cross-linking is generally to be expected. The higher the final chlorine content of the chlorinated polyolefins the lower the chlorination temperature within the indicated range in order to obtain the soluble products of low viscosity according to the invention.

The products obtained according to the process of the invention are well soluble in aromatic hydrocarbons, araliphatic hydrocarbons, chlorinated aliphatic hydrocarbons, esters and mixtures of cycloaliphatic hydrocarbons, such as, for example, turpentine oil or industrial dipentene mixtures. The solutions obtained have a low viscosity in contradistinction to products obtained by chlorinating in carbon tetrachloride. A low viscosity in solution, however, is a prerequisite to the use as lacquer raw material. Highly viscous soluble chloropolyolefins as obtained by chlorination in solution retain high amounts of solvent and, therefore, they require long drying periods. Solutions of this type cannot be blended with purely aliphatic hydrocarbons because in this case the chlorination products would be precipitated. As compared therewith the solubility of the products obtained according to the present process is so good that the solutions thereof can be blended to a considerable extent with organic liquids which are non-solvents, such as, for example, gasoline or alcohols, and are frequently used in lacquer industries owing to their low price.

In comparison with the known soluble chlorination products obtained by heterogeneous chlorination in the presence of water in a temperature range of from 90° C. to 110° C. from substantially straight-chain polyethylenes the present chlorination products are distinguished by a higher stability and a considerably better compatibility with commercial alkyd resins.

As starting materials in the present process are used normally solid, powdery, preferably substantially crystalline homopolymers and copolymers of olefins with at least 3 carbon atoms or copolymers of such olefins with ethylene in which at least 3% and at most 70% by weight, preferably at least 5% and at most 40% by weight of ethylene is replaced by higher olefins, advantageously propylene. There can be used, for example, low pressure polymers obtained according to the processes described in French Patents 1,214,380 and 1,221,143. Especially suitable are substantially crystalline low pressure polyolefins which have been prepared using as catalysts organometal compounds with simultaneous presence of reducible heavy metal compounds. Other low pressure polyolefins may be used, too, for example those which have been prepared in the presence of molybdenum oxides or other oxides of metals of sub-group VI of the Periodic Table, or products the polymerization of which has been controlled by the addition of small amounts of hydrogen or by adding small amounts of higher olefins. The low molecular portions soluble in gasoline and originating from the manufacturing process may remain in the polymer or may be removed by dissolution prior to chlorination.

Other copolymers which can be used are those in which ethylene or other olefin portions, for example propylene portions, are not statically but periodically distributed over the polymer chain. Copolymers of this kind can be produced by changing one or several times the mixing ratio of ethylene/propylene during polymerization or by introducing successively ethylene and propylene into the polymerization vessel as often as desired.

The so-called "periodic copolymers" (as to their preparation, cf. for example "The Plastics Institute Transactions," vol. 28, Feb. 1960, No. 73, pp. 98 et seq.) are especially suitable for making a low viscous soluble chlorination product. With comparable chlorine contents their lacquer films are generally harder than those of copolymers with statically recurring monomer units.

The variation of the ethylene/propylene ratio furthermore enables products of different degrees of hardness to be produced, independent of the chlorine content, resulting in films having different properties of hardness and elongation, whereby the range of application is greatly enlarged. In view of the compatibility which often depends on the chlorine content this fact is of considerable importance on blending with other lacquer raw materials, for example some alkyd resins or plasticizers.

As olefins with at least 3 carbon atoms there can be used, besides propylene, for example butene-1, pentene-1, 4-methyl-pentene-1, hexene-1, or 3,5-dimethyl-butene-1, or mixtures thereof.

Of course, final products with varying properties can also be obtained by using polymers with different molecular weights. According to the molecular weight substances are obtained having a higher or lower softening point. Suitable starting materials are, for example, products having a molecular weight in the range of from 12,000 to 2,000,000 and preferably 30,000 to 200,000.

Nowadays, it is no longer common use to characterize the degree of polymerization by the molecular weight because the usual conversion formulae from specific viscosity to molecular weight becomes more inaccurate the higher the molecular weight. Instead a value derived from the viscosity in solution is given, i.e., the so-called reduced viscosity (eta red.) which is determined with a 0.1% solution in decahydronaphthalene at 135° C. in an Ostwald type viscosimeter and calculated from the relation $$\eta_{red} = \frac{1}{c} \cdot \frac{\eta - \eta_0}{\eta_0}$$

wherein $\eta$ represents the viscosity of the solution
$\eta_0$ represents the viscosity of the solvent and
$c$ represents the concentration of the solution in percent The values of the reduced viscosity are more accurate for low pressure polyolefins than for high pressure polyolefins (cf. Zeitschrift für Angewandte Chemie 67, p. 548 (1955) and Harro Hagen "Polyäthylen und andere Polyolefine," pp. 15 and 50, publishers Brunke Garrels, Hamburg, first edition (1958)).

In practice the starting material is suspended in about 3 to 40 times the amount of water and chlorine is introduced into the suspension. At the beginning the chlorination may be carried out at a temperature below 100° C. It is necessary, however, to raise the temperature then to at least 100° C. since at least 1% of chlorine must be introduced into the product at a chlorination temperature of 100° C. It is advisable to react the polyolefin with chlorine under elevated pressure, for example 20 atmospheres gauge. It is remarkable that a formation of lumps, as can be observed in the chlorination of dispersions of high pressure polyethylenes, does not occur in an advanced state of reaction even if the chlorination is carried out at the beginning at a temperature of or above 65° C. When substances having a grain size of more than 300μ are used, uniform chlorination products can be obtained if the chlorination is carried out in the presence of an aliphatic and/or cycloaliphatic hydrocarbon with at least 6 carbon atoms and/or an aromatic hydrocarbon with at least 7 carbon toms. The hydrocarbons can be used in an amount of up to 100%, preferably 10 to 50%, calculated on the polyolefin. As such accompanying substances there may also be used products obtained from the above hydrocarbons by more or less extensive chlorination, for example up to a chlorine content of 50%. The favorable action of the chlorinated hydrocarbons is obviously based on the fact that they wet or swell the polyolefin. In other words they act as diffusion promotors for chlorine. Depending on the intended use they may remain in the chlorinated final products or they may be removed in simple manner, for example by extraction.

It is not always advantageous to add such diffusion promotors since they may favour the formation of lumps. In this case it is more suitable to use a starting material having a smaller grain size.

The polyolefins to be chlorinated are introduced into the suspension agent in the form of a powder having a grain size of 0.1 to 300μ, advantageously 0.1 to 10μ.

In general, steps must be taken to ensure that the water does not evaporate at the temperatures applied. To achieve this, it is possible to operate under pressure or to add to the water a larger or smaller amount of electrolytes, for example acids and/or salts. By this measure the boiling point of the aqueous phase is increased so that the chlorination may also be carried out under relatively low pressures. Hydrochloric acid may be used, too, as aqueous phase. If desired, emulsifiers, for example alkylaryl-sulfonates or alkylsulfonates and/or catalysts such as radical-liberating substances, for example peroxides such as benzoyl peroxide, toluene peroxide, chlorobenzoyl peroxide, lauroyl peroxide, cyclohexanone peroxide, as well as azonitriles, for eample azobis-isobutyronitrile, or heavy metal salts. The chlorination can be promoted by short wave light or other active rays, for example radio-active rays.

It has been found that oxygen detrimentally affects the chlorinated products during chlorination, obviously by undesired degradation. It is, therefore, advantageous to expel the air present in the apparatus used by a suitable measure, for example by introducing chlorine.

Still further it is suitable to remove the oxygen adsorbed on the polyolefin powder in another way, for example by heating to boiling temperature prior to the beginning of the reaction.

In general, the chlorination is carried out under a chlorine excess pressure of 0.1 to 10 atmospheres gauge, or if desired 20 atmospheres gauge, while care is taken that the suspension is kept in intense mechanical motion, for example by shaking or stirring, to bring about a good contact between the gaseous and the liquid phase. Any hydrogen chloride not dissolved in the reaction mixture may be removed continuously or discontinuously. The progress of the chlorination, which may also be carried out in continuous manner or in a cascade process, is controlled by the amount of hydrogen chloride absorbed in the aqueous phase. The reaction is interrupted as soon as the desired amount of chlorine has been absorbed by the reaction product. The reaction product obtained can be separated from the hydrochloric acid by filtration, washed with water, dried and stabilized. It is likewise possible, however, to add the stabilizer prior to drying or together with the wash water.

With regard to the temperature conditions the following should be said:

When the chlorination is carried out in suspension according to a conventional method at a temperature below 100° C. a hard powder is obtained the crystallite structure of which hardly differs from that of the starting product and which is soluble with very high chlorine contents only. However, it is very difficult and takes much time to obtain products having such high chlorine contents and consequently a sufficient degree of solubility. Moreover, the lacquer films produced by drying such a solution are extremely brittle and mostly tend to the formation of cracks. When, however, the chlorination is carried out at a temperature in the range of from 100° C. to 170° C., in the case of ethylene-contained copolymers 100° C. to 150° C. and preferably 130° C. to 150° C., it is surprising that the products obtained fundamentally differ as to their physical properties from the chlorinated products made by a known method. In the first place the products of the invention differ from chlorination products made at lower temperatures in that they are readily soluble in a series of solvents.

The temperature limit at which soluble chlorination products are formed is not very sharp. It somewhat depends on the molecular weight of the polyolefin used and is the lower the lower the molecular weight of the polyolefin used. It furthermore depends on the type of the basic olefin and with copolymers on the proportions of the various olefins.

It is sometimes advantageous to perform the chlorination in the presence of inert additives or carriers of inorganic or organic nature which are selected so that they may remain in the final product, for example as pigment or agent giving an effect. By the addition of such substances the slight agglomeration of the starting material which may occur in the first stage of the chlorination is fully avoided and the reaction product is obtained in finely flocculent and flowable form which is very advantageous for further processing.

As inorganic additives there may be used silicic acid or diatomaceous earth, barium sulfate, asbestos powder, titanium dioxide, graphite, silicium carbide or glass powder. Suitable organic substances are, in the first place, macromolecular substances, preferably polymers containing halogen and carbon and, occasionally hydrogen such as polyvinyl chloride, polyvinylidene chloride, polychloroprene, polytetrafluoroethylene, polytrifluoroethylene or copolymers of monomers of this type, for example copolymers of vinyl chloride and vinylidene chloride. It is likewise possible to add plastics which may be further chlorinated under the reaction conditions. In order to distribute the product to be chlorinated as uniformly as possible on the inert carrier material the olefin or olefins can be polymerized or copolymerized in the presence of the said carriers.

Some of the properties of the reaction products, such as colour value and viscosity in solution can be further improved by chlorinating at the beginning at lower temperatures, for example in the range of from 50 to 100° C.; and continuing the chlorination with gradual or step-wise increase of temperature to a temperature in the range of from 100° C. to 170° C.

When the starting material is first chlorinated at a temperature below 100° C., i.e. below a temperature at which sintering commences, care is taken by moderate supply of heat or by cooling that a temperature limit of 100° C. or sintering temperature is not reached. The chlorination temperature is increased gradually or in stages as soon as the reaction product has a chlorine content of at least 10%, preferably 25 to 65%. It was surprising that a short-time contact of the reaction product with chlorine in the temperature range of from 100° C. to 170° C. confers upon the chlorination products the properties indicated above. A low pressure polyolefin which has been chlorinated at a temperature below 100° C. to a chlorine content of 59% is soluble in low molecular weight hydrocarbons to a satisfactory extent in the heat only, whereas it swells at room temperature. When one percent of chlorine is introduced at a temperature above the aforesaid temperature limit, products are obtained which are practically completely soluble in the same solvents in the cold. The same effect cannot be obtained by heating an insoluble, chlorinated product, even if the product has a chlorine content with which it would be soluble when chlorinated according to the process of the invention.

The following examples serve to illustrate the invention but they are not intended to limit it thereto.

EXAMPLE 1

An enameled vessel, provided with impeller and current interrupter and having a capacity of 150 liters, was charged with 100 liters of water and then with 4.66 kilograms of a copolymer having a crystalline portion of about 70% and consisting of about 90% of ethylene and about 10% of propylene. The copolymer had an eta red. value of 2.4 and an average grain size of 30μ. 372 cc. of 27% of hydrogen peroxide and 1 cc. of a cationic emulsifier (dimethylbenzyl-alkylammonium chloride in which the alkyl group corresponds to that of coconut oil amine) were added, the open vessel was heated to 98° C. to remove atmospheric oxygen, the vessel was closed and gaseous chlorine was introduced at 101° C. The chlorine pressure in the vessel was gradually increased, after 4½ hours it amounted to 7.0 atmospheres gauge and 24 kilograms of chlorine had been introduced.

After pressure release and scavenging with nitrogen, the main quantity of the aqueous hydrochloric acid formed was drawn off by means of a filter rod, the chlorinated copolymer was repeatedly washed with water and isolated in the form of a fine-grained powder having a chlorine content of 71.5%. The grains of the powder were a little coarser than those of the starting material due to sintering.

The chlorinated final product obtained was readily soluble in aromatic hydrocarbons, esters, carbon tetrachloride and trichloroethylene and a 20% solution thereof in toluene had a viscosity of 140 centipoises at 20° C.

The dry powder was blended with 1% dibutyltin maleinate. It had a stability of over 2 hours according to the "xylene method." The determination of the stability according to the "xylene method" corresponds to a conventional method for determining the stability of chlorinated rubber in which the time is measured after which a paper strip, impregnated with congo red and held above a 30% xylene solution of the chlorohydrocarbon heated at 100° C., begins to turn blue (cf. Felix Wilborn "Physikalische und Technologische Prüfverfahren für Lacke und ihre Rohstoffe," Berliner Union Stuttgart, 1953, vol. I, pp. 86–87).

The color value of the 20% toluene solution was 1 (determined according to DIN Specification 53,403) and after 4½ months in daylight (summer sun) the color value had changed to an immaterial degree only. After having been irradiated with a mercury vapor lamp for 8 hours a dry lacquer film had turned only slightly yellow.

EXAMPLE 2

The vessel described in Example 1 was charged with 2.5 kilograms of fine-grained, substantially crystalline polypropylene having an average grain size of 25μ and an eta red. value of 12.5, 100 liters of potable water, 1.5 cc. of the emulsifier defined in Example 1 and 5 grams of azodiisobutyronitrile as chlorination catalyst and the polymer was chlorinated at 120° C. After 3½ hours 10.5 kilograms of chlorine had been introduced. The internal pressure in the vessel was 7.0 atmospheres gauge. The reaction was continued for 4 hours while stirring. The reaction product was further processed and stabilized as described in Example 1.

6.5 kilograms of fine-grained chloropolypropylene were obtained the grain size of which was a little coarser than that of the starting material due to sintering and which contained 67.0% of chlorine. The chlorinated product was soluble without residue in aromatic hydrocarbons, esters, carbon tetrachloride, chloroform, trichloro-ethylene and other chlorinated aliphatic and halogenated aromatic hydrocarbons. A 20% solution of the chlorinated polymer in toluene had a viscosity of 70 centipoises at 20° C. According to the xylene method a stability of over 2 hours was found.

The product was excellently compatible with most of the commercial alkyd resins and this important utilitarian property is much better than that of a low pressure polyethylene which had been chlorinated by a conventional method at a temperature of 100° C. up to a chlorine content of 65–72%, for example 70.6%.

EXAMPLE 3

2.5 kilograms of crystalline polypropylene having an eta red. value of 2.0 in 100 liters of potable water, 1 liter of concentrated hydrochloric acid and 1.5 cc. of the emulsifier used in Example 1 were reacted as described in said Example 1 at 119–120° C. for 13½ hours with 8.15 kilograms of gaseous chlorine. The addition of chlorine was terminated after 3 hours while the pressure gradually increased to 7.2 atmospheres gauge. The pressure then slowly decreased and amounted to 1.2 atmospheres gauge at the end of the reaction. The reaction product contained 61.2% of chlorine. 5.5 kilograms of chloropolypropylene were obtained which were further processed and stabilized as described in Example 1. The chlorinated product was readily soluble without residue in aromatic hydrocarbons, esters, carbon tetrachloride and trichloroethylene. A 20% solution in toluene had a viscosity of 32 centipoises at 20° C. With and without the addition of a plasticizer the product had excellent film-forming properties. The stability determined according to the xylene method was over 2 hours.

A low pressure polyethylene which had been chlorinated in water at a temperature of 100° C. to a chlorine content of about 61% was incompletely soluble in the customary organic solvents and, therefore, unsuitable as lacquer raw material.

EXAMPLE 4

2 kilograms of crystalline polypropylene having an eta red, value of 7.6, a degree of crystallinity of over 85% and a particle size of less than 20/$\mu$ were suspended in 30 liters of water. The suspension was heated in 141–145° C. and 4.5 kilograms of chlorine were forced in. The reaction was terminated after a few hours. Hydrochloric acid was removed, the product was washed with water and dried. It contained 57% of chlorine.

A 20% solution of the chlorinated product in toluene had a viscosity of 16 centipoises at 20° C. The product was very suitable for making lacquers of good filling power. The unblended lacquer had a high gloss, was very hard and had an elongation of 3% which could be further improved by the addition of plasticizers customarily used in lacquer industries, as shown by the following tests:

(a) A lacquer mixture consisting of 60 grams of xylene
40 grams of butyl acetate
20 grams of gasoline
100 grams of chloropolypropylene (prepared as described above)
15 grams of tricresyl phosphate
40 grams of titanium dioxide was applied to sheet metal and dried. Appearance: glossy; grid division test according to DIN Specification 53 151: very good adhesion; bending test 10 mm. according to DIN 53 152, no cracks at 180°; indentation test according to DIN 53 156: the sheet metal tore.

(b) A lacquer mixture consisting of 70 grams of toluene
40 grams of butyl acetate
90 grams of chloropolypropylene (prepared as described above)
30 grams of chloroparaffin (chlorine content 70%)
100 grams of titanium dioxide was applied to sheet metal and dried. Appearance: high gloss; grid division test according to DIN 53 151: very good adhesion; bending test 10 mm. according to DIN 53 152 no cracks at 180°; indentation test according to DIN 53 156: the sheet metal tore.

(c) A lacquer mixture consisting of 100 grams of toluene
80 grams of chloropolypropylene (prepared as described above)
10 grams of dioctyl phthalate
80 grams of titanium dioxide was applied to sheet metal and dried. Appearance: high gloss; grid division test according to DIN 53 151: very good adhesion; bending test 10 mm. according to DIN 53 152: no cracks at 180°; indentation test according to DIN 53 156: the sheet metal tore.

(d) A lacquer mixture consisting of 100 grams of toluene
30 grams of turpentine oil
80 grams of chloropolypropylene (prepared as described above)
5 grams of chloroparaffin (chlorine content 50%)
10 grams of chlorinated diphenyl (chlorine content 56%)
50 grams of barium sulfate was applied to sheet metal and dried. Appearance: high gloss; grid division test according to DIN 53 151: very good adhesion; bending test 10 mm. according to DIN 53 152: no cracks at 180°; indentation test according to DIN 53 156: the sheet metal tore.

Mixtures (a) to (c) were dry so that dust did not stick in less than 30 minutes.

EXAMPLE 5

2 kilograms of crystalline ethylene-propylene copolymer, having an eta red. value of 4.2, a propylene proportion of 10%, a degree of crystallinity of 60% and a sintering point of 114° C. were chlorinated in 30 liters of water at 60–70° C. in an enameled vessel (capacity 40 liters) under a pressure of 4–5 atmospheres gauge until a chlorine content of 56% had been reached. The reaction product thus obtained was still insoluble in all solvents. The temperature was then raised to 120° C. and the calculated amount of chlorine was forced in until the product contained 66% of chlorine. Due to the chlorination in stages the washed and dried flowable product had finer grains than the product of Example 1. It was readily soluble without residue in the solvents defined in Example 1. A 20% solution in toluene had a viscosity of 160 centipoises.

We claim:
1. A process for the manufacture of highly stable readily soluble chlorination products containing 50–80% of chlorine and having a viscosity of less than 1,000 centipoises at 20° C. in the form of a 20% solution in toluene, which comprises chlorinating in aqueous suspension a member selected from the group consisting of substantially crystalline homopolymers of α-olefins of 3 to 6 carbon atoms, copolymers of such olefins with one another, and copolymers of such olefins with ethylene, conducting at least a portion of the chlorination at a temperature above the sintering temperature of the polymer being chlorinated, and continuing this part of the chlorination until the chlorine content of the polymer is increased by at least 1% by weight as compared to its chlorine content prior to attaining the sintering temperature.

2. A process for the manufacture of highly stable readily soluble chlorination products containing 57–75% of chlorine and having a viscosity of less than 1,000 centipoises at 20° C. in the form of a 20% solution in toluene, which comprises chlorinating in aqueous suspension a member selected from the group consisting of substantially crystalline homopolymers of α-olefins of 3 to 6 carbon atoms, copolymers of such olefins with one another, and copolymers of such olefins with ethylene, conducting at least a portion of the chlorination at a temperature above the sintering temperature of the polymer being chlorinated, and continuing this part of the chlorination until the chlorine content of the polymer is increased by at least 1% by weight as compared to its chlorine content prior to attaining the sintering temperature.

3. A process for the manufacture of highly stable readily soluble chlorination products containing 50–75% of chlorine and having a viscosity of less than 1,000 centipoises at 20° C. in the form of a 20% solution in toluene, which comprises chlorinating in aqueous suspension a member selected from the group consisting of substantially crystalline homopolymers of α-olefins of 3 to 6 carbon atoms, copolymers of such olefins with one another, and copolymers of such olefins with ethylene, conducting at least a portion of the chlorination at a temperature above the sintering temperature of the polymer being chlorinated, and continuing this part of the chlorination until the chlorine content of the polymer is increased by at least 1% by weight as compared to its chlorine content prior to attaining the sintering temperature.

4. Readily soluble highly stable chlorination products containing 50–80% of chlorine and having a viscosity of less than 1,000 centipoises at 20° C. in the form of a 20% solution in toluene prepared by chlorinating in aqueous suspension a number selected from the group consisting of substantially crystalline homopolymers of α-olefins of 3 to 6 carbon atoms, copolymers of such olefins with one another, and copolymers of such olefins with ethylene, conducting at least a portion of the chlorination at a temperature above the sintering temperature of the polymer being chlorinated, and continuing this part of the chlorination until the chlorine content of the polymer is increased by at least 1% by weights as compared to its chlorine content prior to attaining the sintering temperature.

References Cited

UNITED STATES PATENTS 3,227,781   1/1966   Klug et al.

FOREIGN PATENTS 219,209   4/1957   Australia.

JOSEPH L. SCHOFER, Primary Examiner

R. A. GAITHER, Assistant Examiner

U.S. Cl. X.R.

260—93.7, 94.9